United States Patent Office 3,786,080
Patented Jan. 15, 1974

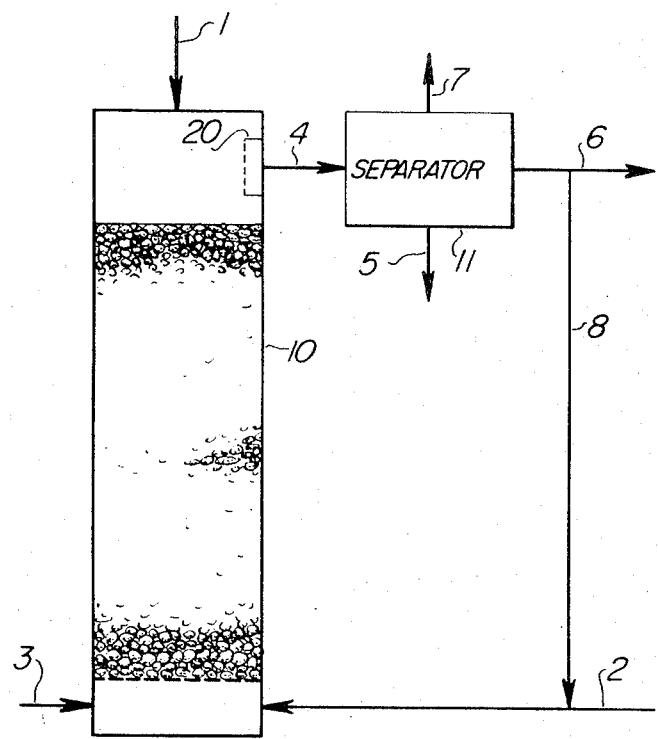

3,786,080
CONTINUOUS PROCESS FOR PRODUCING ALKYLALUMINUM COMPOUNDS
Eiichi Ichiki, Kazuo Iida, Atsuro Matsui, and Hidekimi Kadokura, Niihama-shi, Japan, assignors to Sumitomo Chemical Company, Limited, Osaka, Japan
Filed Feb. 16, 1971, Ser. No. 115,476
Claims priority, application Japan, Feb. 19, 1970, 45/14,586
Int. Cl. C07f 5/06
U.S. Cl. 260—448 A                    13 Claims

ABSTRACT OF THE DISCLOSURE

An alkylaluminum compound is produced continuously and economically with less aluminum loss by reacting hydrogen and an alkylaluminum compound or further an olefin in addition thereto, with an alloy containing aluminum and silicon and having a size larger than that of a metal residue to be withdrawn out of a reaction system in a column-type reactor through passage of said hydrogen, alkylaluminum compound and the olefin, if necessary, through the recator packed with the alloy from the bottom upwards at a temperature of 50°–200° C. under a pressure of 10–300 kg./cm.$^2$, withdrawing a metal residue made to pass substantially through 32–100 mesh sizes by the reaction out of the reaction system together with the alkylaluminum compound and separating the alkylaluminum compound from the metal residue.

---

This invention relates to a continuous process for producing an alkylaluminum compound by subjecting hydrogen and an alkylaluminum compound, or hydrogen, an alkylaluminum compound and an olefin to reaction with an alloy containing aluminum and silicon.

A process for directly synthesizing an alkylaluminum compound by subjecting metallic aluminum, hydrogen and an alkylaluminum compound or further an olefin in addition thereto to a reaction is well known from Japanese Pat. No. 236,648.

In said prior art process, the present inventors previously found that the rate of reaction could be accelerated by using an aluminum alloy containing silicon in place of the metallic aluminum, rather than when the metallic aluminum was used alone. However, as is well known, a continuous process is economically more advantageous than a batch process, but when an alkylaluminum compound is to be continuously produced from an alloy containing aluminum and silicon, there are problems peculiar to the nature of the alloy as the raw material.

That is to say, when the alkylaluminum compound is continuously produced from an alloy containing aluminum and silicon, the metal that does not take part in the reaction must be continuously withdrawn from the reaction system. However, when such metal is withdrawn therefrom at an earlier stage, the alloy containing a large amount of unreacted aluminum must be taken out together, and an aluminum loss is inevitable. On the other hand, when the reaction is carried out under such a condition that the aluminum contained in the alloy completely undergoes reaction, the metal that does not take part in the reaction is accumulated in the reaction system, and the desired continuous process cannot be carried out. These are the problems encountered when the alloy is used as the raw material.

As a result of various studies on a continuous process for smoothly and efficiently producing an alkylaluminum compound from an alloy containing aluminum and silicon, the present inventors have found unexpectedly a specific relation between the particle size distribution and particle sizes of a metal residue as the reaction residue, and the aluminum content of the metal residue, irrespective of the sizes of the raw material alloy, when an alloy incapable of passing through 100 mesh size (the term "mesh" herein used refers to Tyler standard screen series) is used as the raw material alloy. For example, the results as shown in Tables 1 and 2 were obtained under the following conditions:

Composition of raw material alloy: 65.5% by weight of aluminum and 34.5% by weight of silicon
Particle sizes of raw material alloy: 3–4 mesh sizes
Activation: 100 g. of said alloy was placed in 200 g. of triisobutylaluminum containing 2 g. of ethoxysodium and activated at 150° C. for 2 hours
Synthesis: 400 g. of triisobutylaluminum, 880 g. of isobutylene and 100 g. of said activated alloy were charged into an autoclave, and the content was heated to 130° C. Then, the system was subjected to a pressure of 100 kg./cm.$^2$ with hydrogen and the reaction was carried out with stirring. The reaction was discontinued at a definite time and the content was recovered. The particle size distribution of the metal residue and the aluminum content of the particles were measured.

TABLE 1

| | Extraction percentage (percent by weight) [1] | | | | | |
|---|---|---|---|---|---|---|
| | 23 | | 56 | | 73 | |
| Particle size (mesh size) | Amount of residue (g.) | Al content (percent by weight) [2] | Amount of residue (g.) | Al content (percent by weight) [2] | Amount of residue (g.) | Al content (percent by weight) [2] |
| 3–8 | 58.8 | 65.4 | 28.1 | 65.5 | 7.0 | 65.5 |
| 8–14 | 11.9 | 65.8 | 7.0 | 66.4 | 9.1 | 65.9 |
| 14–32 | 4.6 | 63.3 | 5.0 | 65.3 | 7.3 | 63.2 |
| 32–60 | 1.4 | 43.2 | 2.3 | 41.1 | 2.3 | 39.5 |
| 60–100 | 1.0 | 25.4 | 1.9 | 20.2 | 1.9 | 19.3 |
| 100–200 | 1.3 | 12.2 | 3.7 | 6.5 | 4.5 | 6.3 |
| 200–325 | 1.5 | 7.3 | 4.0 | 4.9 | 4.7 | 4.7 |
| 325 | 4.4 | 4.8 | 11.0 | 4.5 | 15.5 | 4.4 |
| Total | 84.9 | | 63.0 | | 52.3 | |

[1] Extraction percentage (percent by weight)
$$= \frac{\text{Amount of aluminum consumed in reaction (g.)}}{\text{Total aluminum amount in charged alloy (g.)}} \times 100$$

[2] Al content (percent by weight)
$$= \frac{\text{Total aluminum amount in each distribution (g.)}}{\text{Total amount of residue in each distribution (g.)}} \times 100$$

Another synthesis was carried out in the same manner as above, except that an alloy having 12–14 mesh sizes was used as the raw material.

TABLE 2

| Particle size (mesh size) | Extraction percentage (percent by weight) [1] | | | | | |
|---|---|---|---|---|---|---|
| | 36 | | 58 | | 76 | |
| | Amount of residue (g.) | Al content (percent by weight) [2] | Amount of residue (g.) | Al content (percent by weight) [2] | Amount of residue (g.) | Al content (percent by weight) [2] |
| 12–14 | 18.5 | 65.4 | 9.9 | 63.1 | 1.8 | 63.5 |
| 14–32 | 43.3 | 64.2 | 31.1 | 62.5 | 18.7 | 61.7 |
| 32–60 | 2.2 | 42.5 | 3.6 | 37.5 | 3.8 | 38.8 |
| 60–100 | 1.0 | 22.3 | 1.4 | 17.3 | 1.9 | 15.3 |
| 100–200 | 1.2 | 8.6 | 1.1 | 6.3 | 1.6 | 5.9 |
| 200–325 | 2.1 | 5.7 | 2.6 | 4.9 | 3.2 | 4.5 |
| 325 | 7.5 | 4.6 | 12.3 | 4.3 | 19.4 | 4.3 |
| Total | 75.8 | | 62.0 | | 50.4 | |

[1] Same as footnote 1, see Table 1 above.
[2] Same as footnote 2, see Table 1 above.

As is clear from the foregoing results that it has been confirmed that the particles of the raw material alloy containing aluminum and silicon were disintegrated through the reaction; only a very small amount of aluminum was retained in the particles which were made to pass through 100 mesh size; the amount of particles having larger particle sizes was reduced with the progress of the reaction, whereas the amount of the particles capable of passing through the 100 mesh size was increased; the amount of the particles having intermediate particle sizes ranging from 32 to 100 mesh sizes was small and substantially unchanged. The present inventors have established a continuous process for producing an alkylaluminum compound without any substantial loss of aluminum on the basis of said finding.

That is, an object of the present invention is to provide a continuous process for producing an alkylaluminum compound from an alloy containing aluminum and silicon, which comprises reacting hydrogen and an alkylaluminum compound or further an olefin in addition thereto with an alloy containing aluminum and silicon having larger sizes and shapes than those of metal residue withdrawn from a reaction system, withdrawing a metal residue made to pass through 32–100 mesh sizes by the reaction together with the alkylaluminum compound from the reaction system and separating the alkylaluminum compound from the metal residue.

The present invention is carried out in a column-type reactor.

The alloy containing aluminum and silicon used in the present invention is defined generally as an alloy containing 87–30% by weight of aluminum, 13–70% by weight of silicon, and 0–20% by weight of iron, copper, titanium, magnesium, etc. in total. When the silicon content is less than 13% by weight, the rate of reaction becomes lower, whereas when the amounts of silicon and other metals are increased, the amount of the materials treated in the reaction operation becomes larger. That is, such is economically undesirable.

Therefore, an alloy having 80–40% by weight of aluminum, 20–60% by weight of silicon and 0–20% by weight of other metals in total is preferably used. The size of the alloy containing aluminum and silicon used as the raw material must be larger than that of the metal residue withdrawn from the reaction system. For example, when the metal residue to be withdrawn from the reaction system is capable of passing through the 100 mesh size, an alloy as the raw material incapable of passing through 100 mesh size, preferably 60 mesh size is used. When the metal residue to be withdrawn from the reaction system is capable of passing through the 32 mesh size, an alloy incapable of passing through 32 mesh size, preferably 14 mesh size, is used. The foregoing explanation is made only of the upper and lower limbs, but a similar thing is applicable to the mesh sizes intermediate between these upper and lower limits.

When a raw material alloy capable of passing through a 100 mesh size is used, separation of the raw material alloy and the residue becomes difficult, and the reaction cannot be carried out continuously. On the other hand, when the metal residue incapable of passing through 32 mesh size is withdrawn out of the reaction system, the metal residue containing a large amount of unreacted aluminum is withdrawn out of the reaction system. Such is not preferable.

Granules of the raw material alloy are generally prepared by a lathe, shaper, drilling machine or through crushing, cutting, atomizing, etc.

It is not always necessary but desirable to activate the alloy containing aluminum and silicon when subjected to the reaction. Any of the well-known mechanical and chemical activation methods proposed for the aluminum can be applied for activation of the raw material alloy. For example, a chemical activation method based on a treatment with such a metallic compound as an activating agent as aluminum hydride, sodium hydride, diethylaluminum chloride, diisobutylaluminum chloride, triethylaluminum, triisobutylaluminum, ethoxysodium, triisobutoxyaluminum, etc. can be advantageously used. Furthermore, the alloy containing aluminum and silicon as the raw material can be activated in advance in another vessel and then charged to reactor, or activated in the reactor.

In carrying out the present invention, the raw material alloy containing aluminum and silicon is supplied into a column-type reactor from the upper part of the reactor, and the reaction is carried out in a packed state in the column-type reactor.

It is desirable to intermittently add the alloy containing aluminum and silicon into the reactor from the upper part of the reactor, in view of the amount of alloy present in the reactor, after the reaction has been started.

The alkylaluminum compound used in the present invention includes such alkylaluminum compounds having an alkyl group having 2 to 20 carbon atoms as trialkyl aluminum, dialkylaluminum hydride (which is used in the presence of an olefin), alkylaluminum halide and alkylaluminum alkoxide. These compounds are used alone or in a mixture.

The olefin used in the present invention includes such olefins having 2–20 carbon atoms as ethylene, propylene, isobutylene, butene-1, butene-2, pentene-1, hexene-1, heptene-1, octene-1, 2-ethylhexene-1, etc.

The alkylaluminum compound, hydrogen and the olefin are introduced into the column-type reactor from the lower part of the reactor. Of course, a portion of said raw materials can be introduced into the reactor from a middle position of the reactor.

The introduction of the alkylaluminum compound, hydrogen and the olefin into the reactor from the lower part thereof is an important condition for carrying out the present invention in that the metal residue made to pass through 32–100 mesh sizes by the reaction is to be withdrawn out of the reaction system.

The reaction temperature is 50°–200° C., particularly 100°–150° C. in the present invention. When the reaction temperature is less than 50° C., the rate of reaction becomes lower, and the reaction becomes industrially disadvantageous. Further, the temperature above 200° C. is not preferable, because the alkylaluminum compound undergoes decomposition.

The reaction pressure is 10–300 kg./cm.$^2$ in the present invention. When the reaction pressure is less than 10 kg./cm.$^2$, the rate of reaction becomes lower, whereas if the reaction pressure exceeds 300 kg./cm.$^2$, the apparatus becomes complicated and impractical.

The reaction is carried out under said synthesis conditions, and the metal residue made to pass through 32–100 mesh sizes by the reaction is withdrawn out of the reaction system together with the alkylaluminum compound.

The metal residue made to pass through the 32–100 mesh sizes is separated from the upper part of the reactor in the following manner. The metal residue can overflow at the upper part of the reactor by adjusting the supply of the alkylaluminum compound and hydrogen, or a 32–100 mesh sizes wiremesh or a baffle plate or other means is provided at the upper part of the reactor to make the metal residue pass therethrough or thereover. Such means is only selected properly at the actual practice.

The separation of the metal residue capable of passing through 32–100 mesh sizes is a very important condition for carrying out the reaction smoothly and efficiently without retaining the metal residue containing substantially no remaining aluminum component unnecessarily in the reactor, as is clear from said experimental facts.

After the metal residue capable of passing through the 32–100 mesh sizes has been withdrawn from the reaction system, the alkylaluminum compound is separated from the metal residue capable of passing through the 32–100 mesh sizes. The separation can be carried out by anyone of filtration, centrifugal separation, sedimentation, evaporation, etc. It is preferable in an industrial practice to recycle a portion of the product alkylaluminum compound obtained by the separation as the raw material.

As explained above, the present invention has the following considerably remarkable effects:

(1) Since the reaction is carried out in a column-type reactor in a closely packed state of the raw material alloy, the side reaction occurring in the liquid phase section, that is, hydrogenation reaction and dimerization reaction of olefin, can be relatively prevented.

(2) Since the raw material alloy having relatively larger particle sizes is used, a cost for the pulverization, crushing, etc. becomes lower.

(3) By withdrawing the metal residue capable of passing through 32–100 mesh sizes from the reaction system, the aluminum loss is eliminated and the metal residue that does not take part in the reaction can be smoothly withdrawn from the reaction system.

According to the present invention, an alkylaluminum compound can be produced smoothly and efficiently in a continuous manner from an alloy containing aluminum and silicon.

Now, the present invention will be explained, referring to examples and drawing, but will not be restricted to the examples, which are only to illustrate the embodiments of the present invention and do not restrict the scope of the present invention.

FIG. 1 shows a schematic flow diagram showing an example of a reactor used in carrying out the present invention and streams of reacting materials and a product in the reaction system.

EXAMPLE 1

Into a reactor 10 having an inner diameter of 85 mm. and a height of 3 m. provided with a wiremesh 20 having 32 mesh size at the upper part of the reactor as shown in FIG. 1 was packed 15.0 kg. of a previously activated alloy consisting of 65.5% by weight of aluminum and 34.5% by weight of silicon and having particle sizes of 3–4 mesh. 27.3 kg./hour of triethylaluminum and 18 Nm.$^3$/hour of hydrogen were supplied through a conduit 2 and conduit 3, respectively, and the reaction was carried out at a reaction temperature of 130° C. under a reaction pressure of 75 kg./cm.$^2$. With the progress of the reaction, 5.0 kg. of the previously activated raw material alloy was supplied to the reactor through a hopper 1 at the upper part of the reactor at an interval of 3 hours 20 minutes. A reaction product solution containing hydrogen and a metal residue capable of passing through 32 mesh size was withdrawn from a conduit 4 and led to a solid-liquid separator 11, where the gas was vented from an outlet 7, and then the metal residue was discharged from an outlet 5. On the other hand, diethylaluminum hydride, a reaction product solution withdrawn from an outlet 6, was passed through an olefin-addition reactor, not shown in the drawing, to convert it to triethylaluminum, and then recycled to the reactor 10 as the raw material from the conduit 2 through a conduit 8, and a portion thereof was withdrawn from the conduit 6. When the reaction was brought into a stationary state, the reaction product solution from the reactor contained 19.4 kg./hour of triethylaluminum, 8.9 kg./hour of diethylaluminum hydride and 570 g./hour of the metal residue capable of passing through 32 mesh size. Analysis of the metal residue revealed that 570 g. of the metal residue contained 52 g. of aluminum.

For comparison, the reaction was carried out in the same manner as above except that the wiremesh was replaced with a 14 mesh size wiremesh to withdraw a metal residue capable of passing through 14 mesh size. As a result, the reaction product solution contained 21.3 kg./hour of triethylaluminum, 6.8 kg./hour of diethyl-aluminum hydride and 793 g./hour of the metal residue capable of passing through 14 mesh size. Analysis of the metal residue revealed that 793 g. of the metal residue contained 275 g. of aluminum.

As is clear from the above result, when the metal residue capable of passing through 14 mesh size was withdrawn out of the reaction system, the aluminum loss was very great, and considerably uneconomical, as compared with the present invention.

EXAMPLE 2

Into the same reactor 10 as in Example 1 except that the wiremesh 20 was removed from the reactor was packed 15.0 kg. of a previously activated alloy consisting of 73.3% by weight of aluminum and 26.7% by weight of silicon and having particle sizes of 6–10 mesh. 7.9 kg./hour of triisobutylaluminum was introduced into the reactor through the conduit 2, and 11.2 kg./hour of isobutylene and 6.0 Nm.$^3$/hour of hydrogen were introduced into the reactor through the conduit 3, and the reaction was carried out at a reaction temperature of 130° C. under a reaction pressure of 100 kg./cm.$^2$. With the progress of the reaction, 5.4 kg. of the previously activated raw material alloy was supplied to the reactor from the hopper 1 at the upper part of the reactor at an interval of 4 hours.

A reaction product solution containing a metal residue capable of passing through 60 mesh size was withdrawn from the reactor 10, and then led to the solid-liquid separator 11, where the gas was vented from the outlet 7, and the metal residue was discharged from the outlet 5. On the other hand, a portion of triisobutylaluminum, the reaction product solution withdrawn from the conduit 6, was recycled to the reaction as the raw material from the conduit 2 through the conduit 8. When the reaction was brought into a stationary state, the reaction product solution from the reactor contained 14.9 kg./hour of triisobutylaluminum, and 406 g./hour of the metal residue capable of passing through 60 mesh size.

Analysis of the metal residue revealed that 406 g. of the metal residue contained 46 g. of aluminum.

The reaction could be continuously carried out without any trouble.

EXAMPLE 3

Crude alloy prepared by direct reduction of a mixture of clay and bauxite (the alloy composition was 58.4% by weight of aluminum, 39.0% by weight of silicon, 2.1% by weight of iron and 0.5% by weight of titanium) was crushed by a crusher, whereby a raw material alloy having 22.5% by weight of 3–4 mesh size component, 41.7% by weight of 4–8 mesh size component, 26.5% by weight of 8–14 mesh size component, 6.9% by weight of 14–32 mesh size component and 2.4% by weight of 32 mesh size through component was obtained.

Into the same reactor as in Example 2 was packed 15.0 kg. of said alloy previously activated, and 7.9 kg./hour of triisobutylaluminum was introduced into the reactor through the conduit 2, and 11.2 kg./hour of isobutylene and 6.0 Nm.$^3$/hour of hydrogen were introduced therein through the conduit 3. The reaction was carried out at a reaction temperature of 130° C. under a reaction pressure of 100 kg./cm.$^2$. With the progress of the reaction, 4.8 kg. of the previously activated raw material alloy was supplied to the reactor from the hopper 1 at the upper part of the reactor at an interval of 4 hours.

A reaction product solution containing a metal residue capable of passing through 60 mesh size was withdrawn from the reactor and then led to the solid-liquid separator 11, where the gas was vented from the outlet 7, and the metal residue was discharged from the outlet 5. On the other hand, a portion of triisobutylaluminum, the reaction product solution withdrawn from the conduit 6, was recycled to the reactor as the raw material from the conduit 2 through the conduit 8. When the reaction was brought into a stationary state, the reaction product solution from the reactor contained 12.7 kg./hour of triisobutylaluminum and 546 g./hour of the metal residue capable of passing through the 60 mesh size.

Analysis of the metal residue revealed that 546 g. of the metal residue contained 47 g. of aluminum.

The reaction could be continuously carried out without any trouble at all.

What is claimed is:

1. A continuous process for producing an alkylaluminum compound by reacting hydrogen and an alkylaluminum compound selected from the group consisting of trialkyl aluminum, dialkylaluminum hydride, alkylaluminum halide and alkylaluminium alkoxide with or without an olefin with an alloy containing aluminum and silicon in particle form at an elevated temperature and elevated pressure, which comprises continuously withdrawing the smaller particles of below about 100 mesh being formed during the reaction and essentially consisting of those alloy components which do not react with the alkylaluminum compound from the reactor together with the alkylaluminum compound, and then separating the alkylaluminum compound from the metal residue.

2. A continuous process according to claim 1, wherein the reaction is carried out in a column-type reactor.

3. A continuous process according to claim 1 wherein the starting aluminum-silicon alloys having a particle size of above 32 mesh is used.

4. A continuous process according to claim 2, wherein the reaction is carried out by supplying an alkylaluminum compound and hydrogen or further an olefin in addition thereto to the lower part of the column-type reactor packed with the alloy and withdrawing the metal residue together with the alkylaluminum from the upper part of the reactor, while supplying the alloy to the reactor intermittently.

5. A continuous process according to claim 1, wherein the reaction is carried out at a temperature of 50°–200° C.

6. A continuous process according to claim 5, wherein the reaction is carried out at a temperature of 100°–150° C.

7. A continuous process according to claim 1, wherein the reaction is carried out under a pressure of 10–300 kg./cm.$^2$.

8. A process according to claim 1, wherein the previously activated alloy is used.

9. A process according to claim 1, wherein the alloy containing 80–40% by weight of aluminum, 20–60% by weight of silicon and 0–20% by weight of other metals in total is used.

10. A process according to claim 1, wherein the alkylaluminum is alkylaluminum compounds having an alkyl group having 2 to 20 carbon atoms.

11. A process according to claim 10, wherein the alkylaluminum compound is trialkylaluminum, dialkylaluminum hydride, alkylaluminium halide and alkylaluminum alkoxide.

12. A process according to claim 1, wherein the olefin is olefins having 2–20 carbon atoms.

13. A process according to claim 12, wherein the olefin is ethylene, propylene, isobutylene, butene-1, butene-2, pentene-1, hexene-1, heptene-1, octene-1 and 2-ethylhexane-1.

References Cited

UNITED STATES PATENTS

| | | | |
|---|---|---|---|
| 2,930,808 | 3/1960 | Lasel | 260—448 A |
| 3,393,217 | 7/1968 | Ichiki et al. | 260—448 A |
| 3,402,190 | 9/1968 | Toyoshima et al. | 260—448 A |
| 3,388,142 | 6/1968 | Cameron et al. | 260—448 A |
| 3,207,770 | 9/1965 | Ziegler et al. | 260—448 A |
| 3,373,179 | 3/1968 | Lewis | 260—448 A |

FOREIGN PATENTS

| | | | |
|---|---|---|---|
| 787,945 | 6/1968 | Canada | 260—448 A |
| 1,167,837 | 4/1958 | Germany | 260—448 A |

HELEN M. S. SNEED, Primary Examiner